US007314310B2

(12) United States Patent  (10) Patent No.: US 7,314,310 B2
Medero  (45) Date of Patent: Jan. 1, 2008

(54) PREDICTIVE TEMPERATURE PROBE WITH PROXIMITY SENSOR

(75) Inventor: Richard Medero, Tampa, FL (US)

(73) Assignee: The General Electric Company, Schenectady, NY (US)

( * ) Notice: Subject to any disclaimer, the term of this patent is extended or adjusted under 35 U.S.C. 154(b) by 98 days.

(21) Appl. No.: 11/279,626

(22) Filed: Apr. 13, 2006

(65) Prior Publication Data

US 2007/0242726 A1 Oct. 18, 2007

(51) Int. Cl.
G01K 7/00 (2006.01)
G01K 1/08 (2006.01)
A61B 5/01 (2006.01)

(52) U.S. Cl. .................. 374/164; 374/209; 600/549
(58) Field of Classification Search ........... 374/164, 374/209; 600/473–474, 549
See application file for complete search history.

(56) References Cited

U.S. PATENT DOCUMENTS

| 3,738,479 | A | * | 6/1973 | Sato ..................... 374/209 |
| 3,832,902 | A | * | 9/1974 | Usami et al. ........... 374/164 |
| 4,158,965 | A | | 6/1979 | Prosky |
| 4,183,248 | A | | 1/1980 | West |
| 4,538,927 | A | * | 9/1985 | Jochemczyk et al. ..... 374/163 |
| 5,632,555 | A | | 5/1997 | Gregory et al. |
| 5,790,107 | A | | 8/1998 | Kasser et al. |
| 6,109,784 | A | | 8/2000 | Weiss |
| 6,146,015 | A | | 11/2000 | Weiss |
| 6,355,916 | B1 | | 3/2002 | Siefert |
| 6,495,806 | B2 | | 12/2002 | Siefert |
| 6,518,820 | B2 | | 2/2003 | Gremm |
| 6,632,016 | B2 | | 10/2003 | Chen et al. |
| 6,698,921 | B2 | | 3/2004 | Siefert |
| 6,854,882 | B2 | * | 2/2005 | Chen ..................... 374/208 |
| 6,962,168 | B2 | | 11/2005 | McDaniel et al. |
| 2002/0115920 | A1 | * | 8/2002 | Rich et al. ............. 600/345 |
| 2007/0100253 | A1 | * | 5/2007 | Sisk et al. ............. 600/549 |

OTHER PUBLICATIONS

Capacitive Proximity Sensors: Theory of Operation (2003) http://web.archive.org/web/20031209153102/http://www.sea.siemens.com/step/pdfs/snrs_3.pdf.*
Alaris® Tri-Site Thermometer, Cardinal Health.
Alaris® Turbo Temp® Thermometer, Cardinal Health.
Alaris® Tri-Site Thermometer—Directions for Use, Cardinal Health, pp. 1-20.
IVAC® TURBO ★ TEMP™ Electronic Thermometer—Models 218X—Directions for Use, pp. 1-16.

* cited by examiner

Primary Examiner—Mark Robinson
Assistant Examiner—Bret Adams
(74) Attorney, Agent, or Firm—Andrus, Sceales, Starke & Sawall, LLP

(57) ABSTRACT

A system and method for preheating the thermometer probe of an electronic thermometer to a temperature closer to the temperature of the patient to be monitored. The system includes a thermometer probe that includes a heater, temperature sensor and proximity sensor, each coupled to a processor for controlling the operation of the electronic thermometer. The proximity sensor positioned within the thermometer probe generates a contact signal when the thermometer probe is positioned in close proximity to the patient. Upon receiving the contact signal, the processor disables the operation of the heater and begins the process of estimating the patient temperature. By utilizing a separate proximity sensor, the temperature of the probe tip can be elevated to the normal human body temperature, which allows the temperature estimation to be completed more rapidly and allows the thermometer to function at higher ambient temperature environments.

18 Claims, 5 Drawing Sheets

PREDICTIVE TEMPERATURE PROBE WITH PROXIMITY SENSOR

BACKGROUND OF THE INVENTION

The present invention generally relates to electronic thermometers. More specifically, the present invention relates to an electronic thermometer having a contact sensor that allows the thermometer to more rapidly obtain accurate temperature measurements from a patient.

It is common practice in the medical field to determine the body temperature of a patient by means of a temperature sensitive device that not only measures the temperature of the patient but also displays that temperature to the caregiver. Such temperature measurements are taken routinely in hospitals and in doctors' offices. Presently available electronic thermometers can take tens of seconds in its predictive mode and five or more minutes in its monitoring or direct reading mode to return a temperature to the caregiver. Electronic predictive thermometers have become popular because in their predictive mode, the time for taking the temperature is much less than a mercury thermometer. For busy nursing staff, time is of the essence and any reduction in the amount of time to obtain a temperature measurement allows the nursing staff to be more productive.

An inherent characteristic of electronic thermometers is that they do not instantaneously measure the temperature of the sites to which they are applied. It may take a substantial period of time before the temperature sensitive device stabilizes at the temperature of the site such that the temperature indicated by the thermometer is representative of the actual temperature of the body or sight being measured. This lag is caused by the various components of the measurement system that impede heat flow from the surface of the body or site to the temperature sensor.

One common approach to shortening the amount of time required for an electronic thermometer to take an accurate reading of a patient's temperature is to preheat the probe tip of the thermometer to a temperature close to the expected patient temperature. Such probe tip heaters have been known for many years and are shown in U.S. Pat. Nos. 5,632,555; 6,495,806 and 6,698,921 as an example. A commercially available product that utilizes a probe tip heater is the Turbo-Temp™ electronic thermometer available from IVAC®.

In prior art electronic thermometers that utilize a probe tip heater to raise the tip temperature prior to insertion of the probe into the patient's mouth, the control unit of the thermometer heats the probe tip to a temperature well below the normal human core body temperature of 98.6° F. In the presently available electronic thermometers, the processing circuitry within the electronic thermometer monitors for a rise in the temperature at the probe tip as an indicator that the probe tip has been properly positioned either within the patient's mouth or at another acceptable location.

Since the electronic circuitry monitors for an increase in the temperature at the probe tip to indicate contact with the patient, the temperature of the probe tip must be kept well below the normal human body temperature of 98.6° F. As an example, current electronic thermometers that utilize probe tip heating maintain the probe tip at a temperature of approximately 93° F. Thus, when the probe tip is placed within the patient's mouth, the temperature of the probe tip must elevate to approach the temperature of the patient. This rise in temperature creates a delay in measuring the patient's temperature. As can be readily understood, electronic thermometers that maintain the probe tip temperature at approximately 93° F. cannot be used in the predictive mode when the ambient temperature is above 93° F. since the temperature of the probe tip will be at the ambient temperature. Since the electronic circuitry monitors for an increase in temperature at the probe tip, the change in the temperature will be difficult to detect when the probe tip is at an ambient temperature above 93° F.

Therefore, it would be desirable to increase the speed at which the patient's temperature may be taken by increasing the temperature of the probe tip prior to determining the patient's temperature. Further, it would be desirable to provide a system that would enable the use of the predictive mode of the electronic thermometer at higher ambient temperatures.

SUMMARY OF THE INVENTION

The present invention is a system and method for estimating the temperature of a patient utilizing an electronic thermometer. The electronic thermometer includes a thermometer probe that is positioned in contact with the patient. The thermometer probe includes an internal temperature sensor and heater such that a control unit of the electronic thermometer can operate the heater to maintain the temperature of the probe tip of the thermometer probe at a target temperature.

The thermometer probe further includes a proximity sensor positioned within the probe tip. The proximity sensor is configured to generate a contact signal when the probe tip is placed in contact with or in close proximity to the patient. The proximity sensor is operated separately from the temperature sensor and the heater and generates a contact signal, which may be an analog signal or an on/off signal depending upon the sensor, upon detection of the patient.

When the control unit of the electronic thermometer receives the contact signal from the proximity sensor, the control unit disables operation of the heater and begins the process of determining the temperature of the patient based upon the temperature signal from the temperature sensor.

In one embodiment of the invention, the proximity sensor is a capacitive proximity sensor that includes an alternating current applied to the metallic probe tip. When the metallic probe tip is positioned in close proximity with the patient, the impedance between the metallic probe tip and the patient decreases, causing an increase in the amount of current supplied to the probe tip. A processor within the control unit monitors the amount of current supplied to the probe tip such that an increase in the current indicates that the probe tip has been placed in close proximity to the patient. Upon the detection of the increased current, the processor disables operation of the heater and begins the process of obtaining a temperature estimate for the patient.

Although a capacitive proximity sensor is described in one embodiment of the invention, various different other types of proximity or contact sensors can be utilized while operating within the scope of the present invention. Most importantly, the proximity sensor is provided separate from the temperature sensor such that the processor does not need to detect a rise in temperature of the probe tip to indicate that the probe tip is placed in contact with the patient. Instead, the contact signal from the proximity sensor provides an indication to the processor that the probe tip is in close proximity to or in contact with the patient, thus signaling the beginning of the process of obtaining temperature signals and generating a temperature estimate for the patient.

BRIEF DESCRIPTION OF THE DRAWINGS

The drawings illustrate the best mode presently contemplated of carrying out the invention. In the drawings.

DETAILED DESCRIPTION OF THE INVENTION

Figure 1:
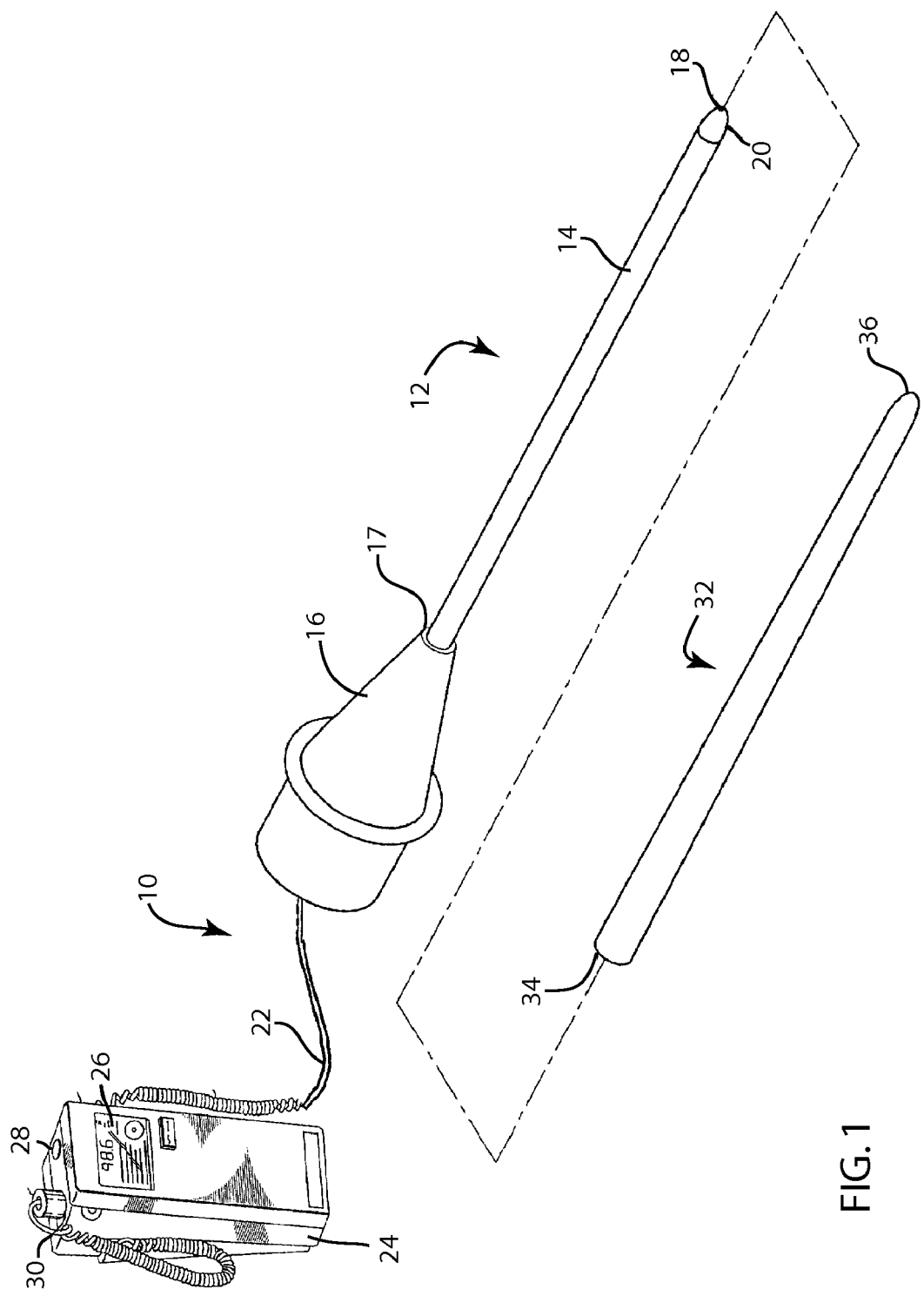
FIG. 1 is a perspective view showing an electronic thermometer probe and probe cover assembly incorporating a probe tip having a temperature sensor, probe tip heater and proximity sensor.

Referring first to FIG. 1, thereshown is an electronic thermometer 10 that is operable to estimate the temperature of a patient. The electronic thermometer 10 includes a thermometer probe 12 that includes an extended probe body 14 extending from a probe housing 16. The probe body 14 extends between a proximal end 17 and a distal end 18 that is defined by the probe tip 20. The thermometer probe 12 includes an electric cable 22 that connects the thermometer probe 12 to the control unit 24 that includes a primary processor that receives the data signals from the thermometer probe 12 and generates an estimated temperature on a display 26. In the embodiment shown in FIG. 1, the control unit 24 includes a well 28 that is sized to receive the entire thermometer probe 12, which is supported by the probe housing 16. In the embodiment shown in FIG. 1, the electronic thermometer 10 includes a second thermometer probe 30 received within the control unit 24.

In the embodiment of the invention shown in FIG. 1, the probe body receives a probe cover 32 that is shaped and sized to fit over the probe body 14. The probe cover 32 includes an open end 34 to accept the probe body 14 and a distal tip 36 to fit snugly and securely over the probe tip 20.

Figure 3:
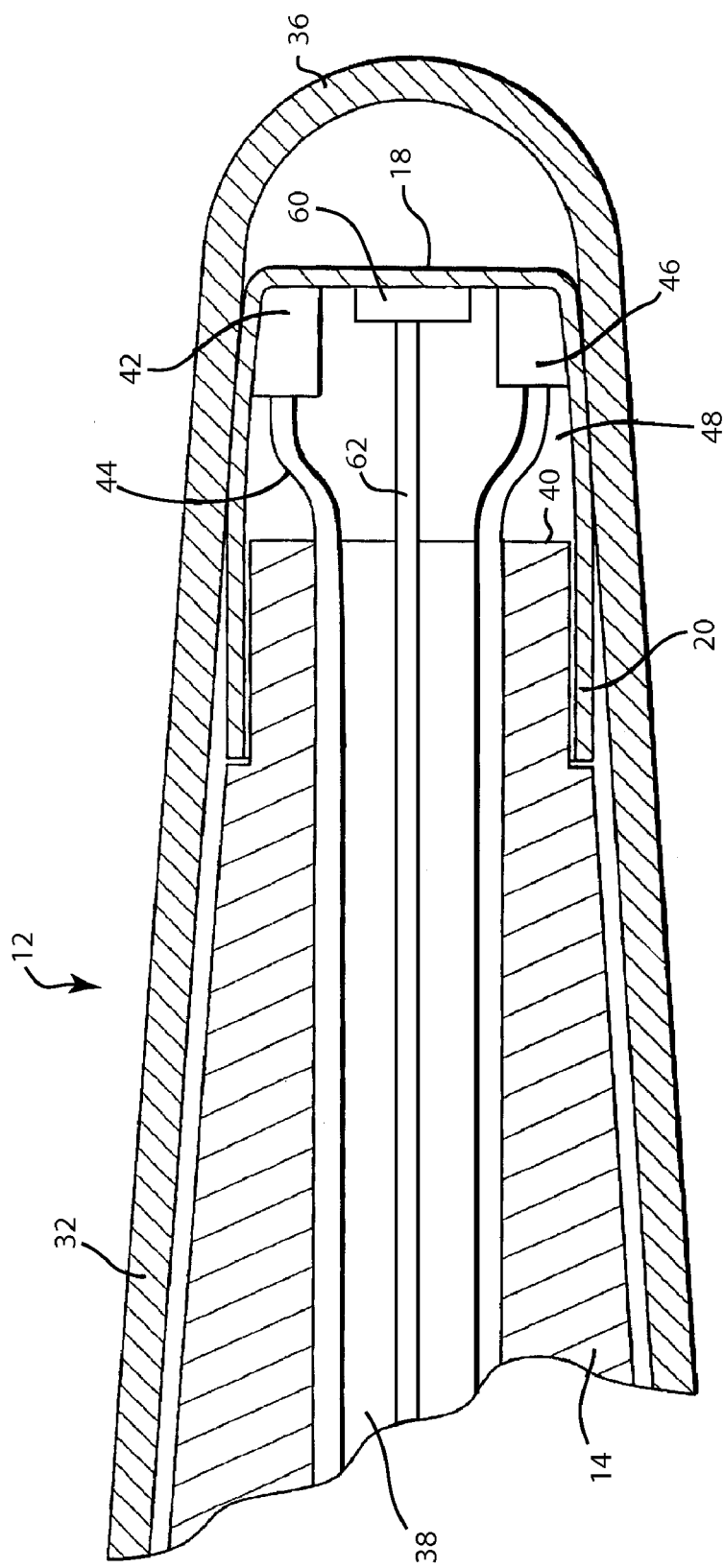
FIG. 3 is a cross-sectional view of the probe and probe cover of FIG. 1 showing the positioning of the probe tip heater, temperature sensor, and proximity sensor.

Referring now to FIG. 3, the operating components within the probe body 14 are generally shown. As illustrated, the probe body 14 defines a hollow passageway 38 that extends along the length of the probe body to a distal end 40. In the preferred embodiment of the invention, the probe body 14 is formed from a durable plastic material, although other materials are contemplated as being within the scope of the invention. The distal end 40 of the probe body receives a metallic probe tip 20 that is preferably press fit into contact with the probe body. The probe tip 20 is a cap-like member that engages the probe body 14 and defines the distal end 18 of the entire thermometer probe 12.

As shown in FIG. 3, the thermometer probe 12 includes a heater 42 that is positioned in contact with the metallic probe tip 20. The heater 42 is connected by an electrical conductor 44 to the operating components contained within the control unit 24. A processor contained within the control unit provides a supply of current to the heater 42, which allows the heater 42 to generate heat and elevate the temperature of the probe tip 42 to a target temperature. In the preferred embodiment of the invention, the heater 42 is a resistive heater that generates heat upon the supply of current to the resistor.

In addition to the heater 42, the thermometer probe 12 includes a temperature sensor 46 positioned in contact with the metallic probe tip 20. The temperature sensor 46 is connected by the electrical conductor to the control unit such that the control unit can monitor the temperature of the probe tip by the electrical temperature signals generated by the temperature sensor 46. In the preferred embodiment, the temperature sensor 46 is a thermistor whose resistance changes as the temperature of the probe tip 20 increases or decreases. The temperature sensor 46 generates a temperature signal, which is an analog voltage or current representative of the resistance of the thermistor, and thus representative of the sensed temperature of the metallic probe tip. The electrical temperature signal received from the temperature sensor 46 is received by an analog to digital converter 50, as shown in FIG. 4, and the digital signal from the A/D converter 50 is received by the processor 52 contained within the control unit of the electronic thermometer.

Figure 4:
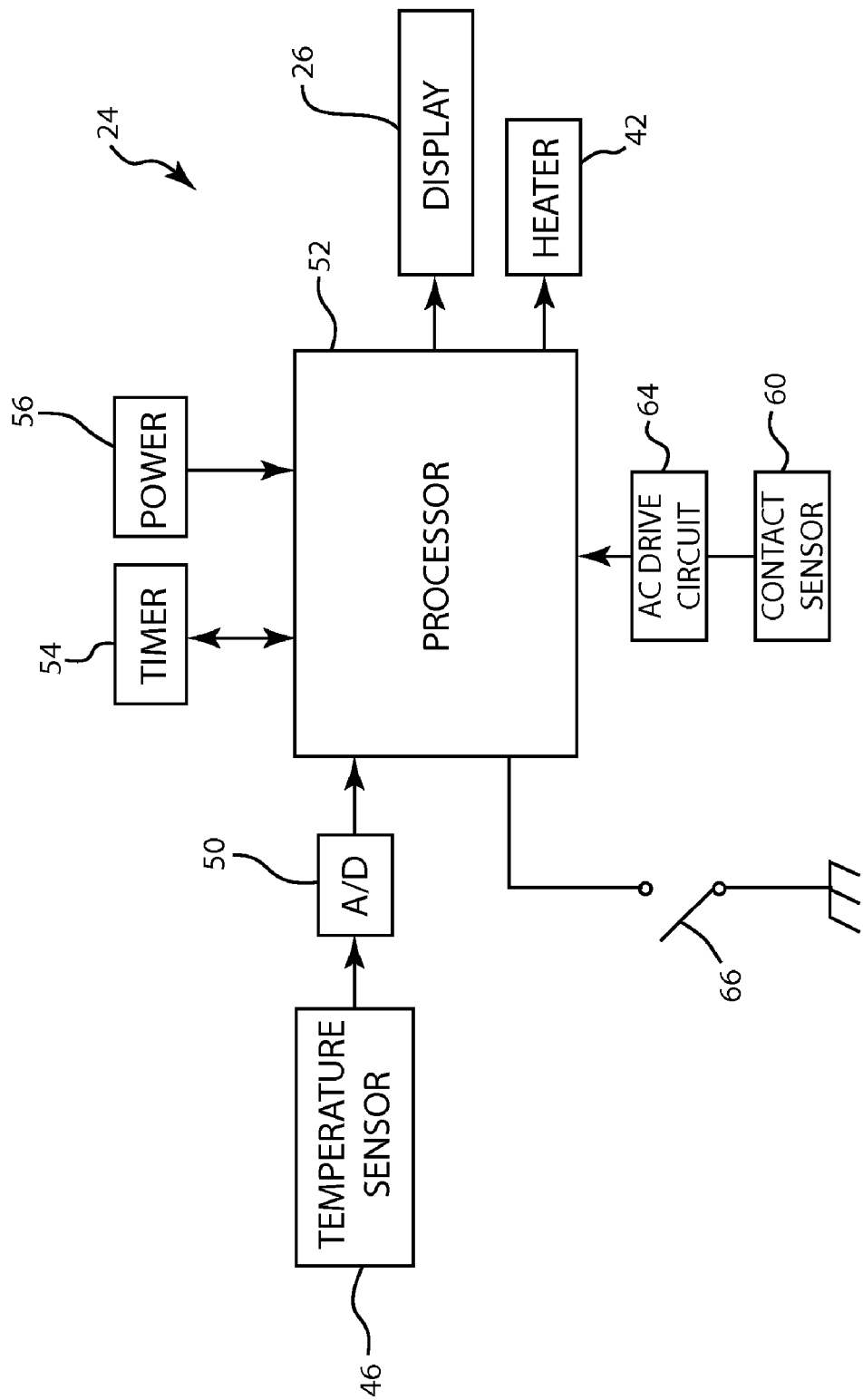
FIG. 4 is a block diagram view of a temperature measurement system incorporating a processor forming part of the system for controlling the temperature of the probe and responding to a signal from the proximity sensor.

As illustrated in FIG. 4, a timer 54 provides time signals to the processor 52 that are used during the processing of the temperature signal and a power source 56, such as a self-contained battery, is connected to the processor 52 to both power the processor and allow the processor to control the application of power to the heater 42 and the temperature sensor 46.

Figure 2:
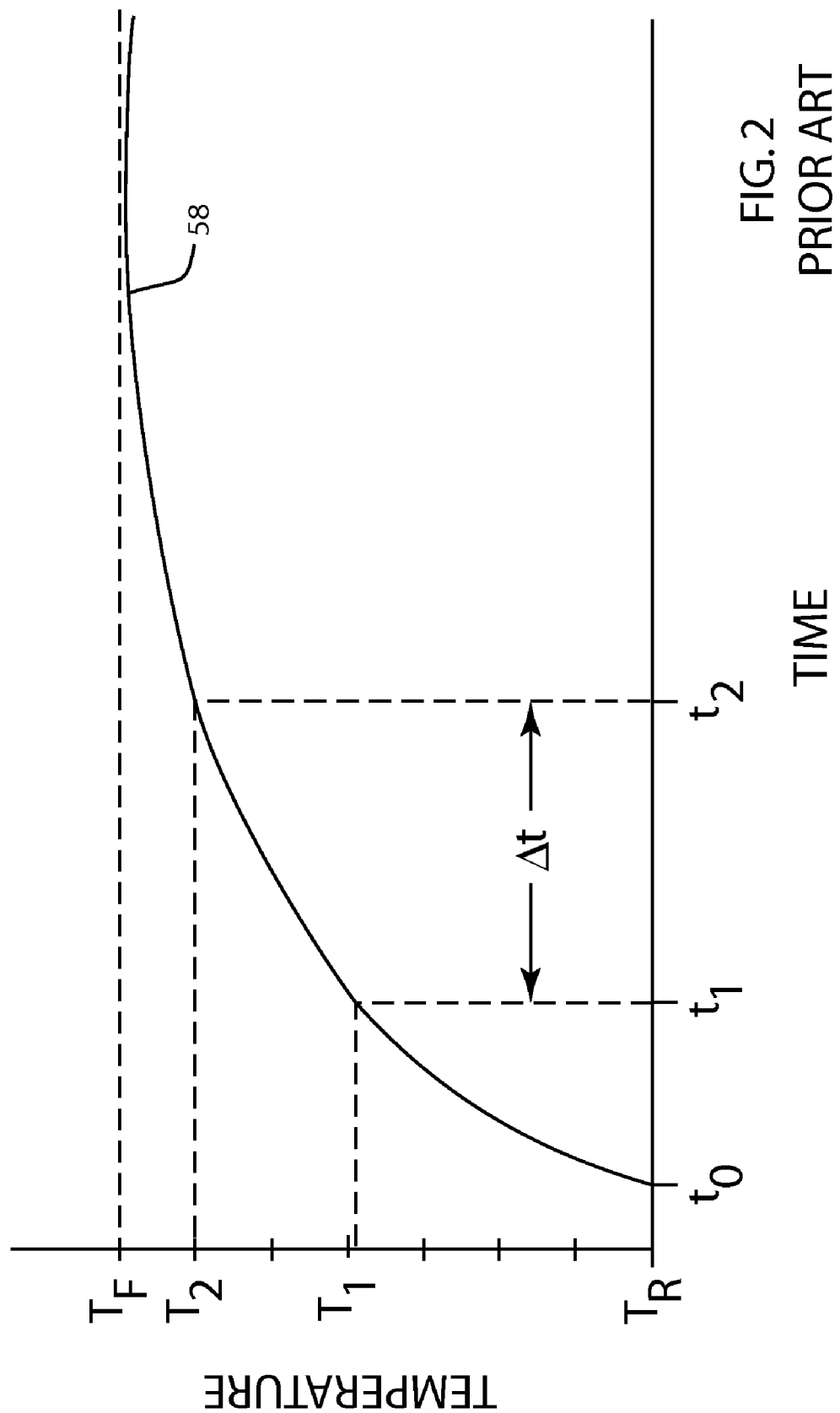
FIG. 2 is a graphic illustration of a typical temperature sensor response curve when in contact with a body that differs from, and is higher than, its own temperature.

In prior art electronic thermometers that include both the heater and thermometer sensor, the temperature of the probe tip is maintained at temperature $T_R$ as shown in FIG. 2. Typically, the temperature $T_R$ is set to be a temperature well below the normal temperature for a human patient of 98.6° F.

When the probe tip of the prior art electronic thermometers are brought into contact with a patient, the sensed temperature of the probe tip, as shown by line 58, begins to increase rapidly from $T_R$ to $T_1$ between the times $t_o$ and $t_1$. The increase of the temperature is detected by the processor of the electronic thermometer, thus signaling to the processor that the probe tip has been placed in contact with the patient. Since prior electronic thermometers utilize the increase in temperature at the probe tip to indicate that the probe tip is in contact with the patient, the temperature $T_R$ must be held well below the normal temperature of a patient. As an example, in prior electronic thermometers, the temperature $T_R$ is typically held at temperatures in the range of 90° F.-93° F.

Referring back to FIG. 2, the rate of increase in the indicated temperature line 58 is reduced between times $t_1$ and $t_2$ as the temperature line 58 gradually trends toward the actual temperature of the patient $T_F$. As can be understood in FIG. 2, the greater the difference between the temperature of the probe $T_R$ and the actual temperature of the patient $T_F$, the greater the amount of time required for the electronic thermometer to estimate the patient's temperature. In prior art systems, such as shown in U.S. Pat. No. 6,698,921, the processor of the electronic thermometer estimates the temperature of the patient based upon complex estimation parameters utilizing the time $\Delta t$ and the temperature $T_2$ to estimate the patient's temperature $T_F$. However, these estimations still require a delay for the temperature probe to reach the temperature $T_2$ prior to generating the estimate $T_F$.

Referring now to FIG. 3, the thermometer probe 12 of the present invention includes a proximity sensor 60 positioned in contact with the metallic probe tip 20 and connected to the processor by an electrical conductor 62. The proximity sensor 60 is positioned within the probe tip 20 such that the proximity sensor 60 generates a contact signal as the probe tip 20 is moved into close proximity with the patient. The use of the proximity sensor 60 to detect the close proximity between the thermometer probe 12, and specifically the probe tip 20, and the patient allows the electronic thermometer to utilize a separate signal from the temperature signal from sensor 46 to determine when the probe tip is positioned to detect the patient's temperature. Thus, the temperature of the probe tip 20 can be significantly elevated, and preferably held at approximately 98.6° F. to reduce the amount of time required to estimate the patient's temperature.

In a proposed embodiment of the invention, the proximity sensor 60 can simply utilize the metallic probe tip 20 as a plate of a capacitor, where the opposite "plate" of the capacitor is represented by the patient. As illustrated in FIG. 4, an AC drive circuit 64 can supply an AC voltage to the probe tip. When the probe tip is positioned a significant distance from the patient, the current flowing through the AC drive circuit 64 will have a constant value that can be monitored by the processor 52. However, when the probe tip 20 is brought into close proximity with a patient, the impedance between the probe tip 20 and the patient will decrease, resulting in an increase in the current being supplied to the contact sensor 60. The increase in current will act as a contact signal indicating to the processor 52 that the probe tip is in close proximity with the patient. Once the processor 52 detects the presence of the contact signal, in this case an increase in current, the processor 52 can take the appropriate action to disable the operation of the heater 42 and begin monitoring the temperature signals from the temperature sensor 46.

Referring back to FIG. 3, the metallic probe tip 20 is shown covered by the probe cover 32, which is preferably a disposable product formed from a plastic material to aid in the sterilization of the thermometer probe. In the contemplated embodiment in which the proximity sensor 60 utilizes the metallic probe tip 20 as a plate of the capacitor, the proximity sensor 60 will be able to detect the close proximity of the patient through the plastic probe cover 32. Thus, when the probe cover 32 is placed in contact with the patient, the patient will be in very close proximity to the probe tip 20, resulting in an increase in the amount of current supplied to the proximity sensor 60.

In an embodiment of the invention that utilizes the metallic probe tip 20 as a plate of a capacitor, the contact signal received by the processor will be a varying current that increases as the probe tip is brought into closer proximity with the patient. The processor can be configured to indicate acceptable contact between the probe tip and the patient when the current level reaches a predefined threshold. The value for the predefined threshold can be adjusted to vary the sensitivity of the system to actual patient contact.

Although one type of proximity sensor 60 is described above, it is important to recognize that various different types of proximity sensors 60 can be utilized within the scope of the present invention. Most importantly, the proximity sensor 60 is operable to detect the very close proximity of the patient to the probe tip 20 such that the processor can terminate operation of the heater and begin the process of determining the patient's temperature. The use of the proximity sensor 60 allows the electronic thermometer to no longer be dependent upon the rising temperature signal from the temperature sensor 46 to determine when the probe tip is in contact with the patient. The elimination of the reliance upon the temperature signal allows the electronic thermometer to maintain the probe tip temperature much closer to normal human body temperature, thus resulting in a decrease in the amount of time required to estimate a patient's body temperature.

Figure 5:
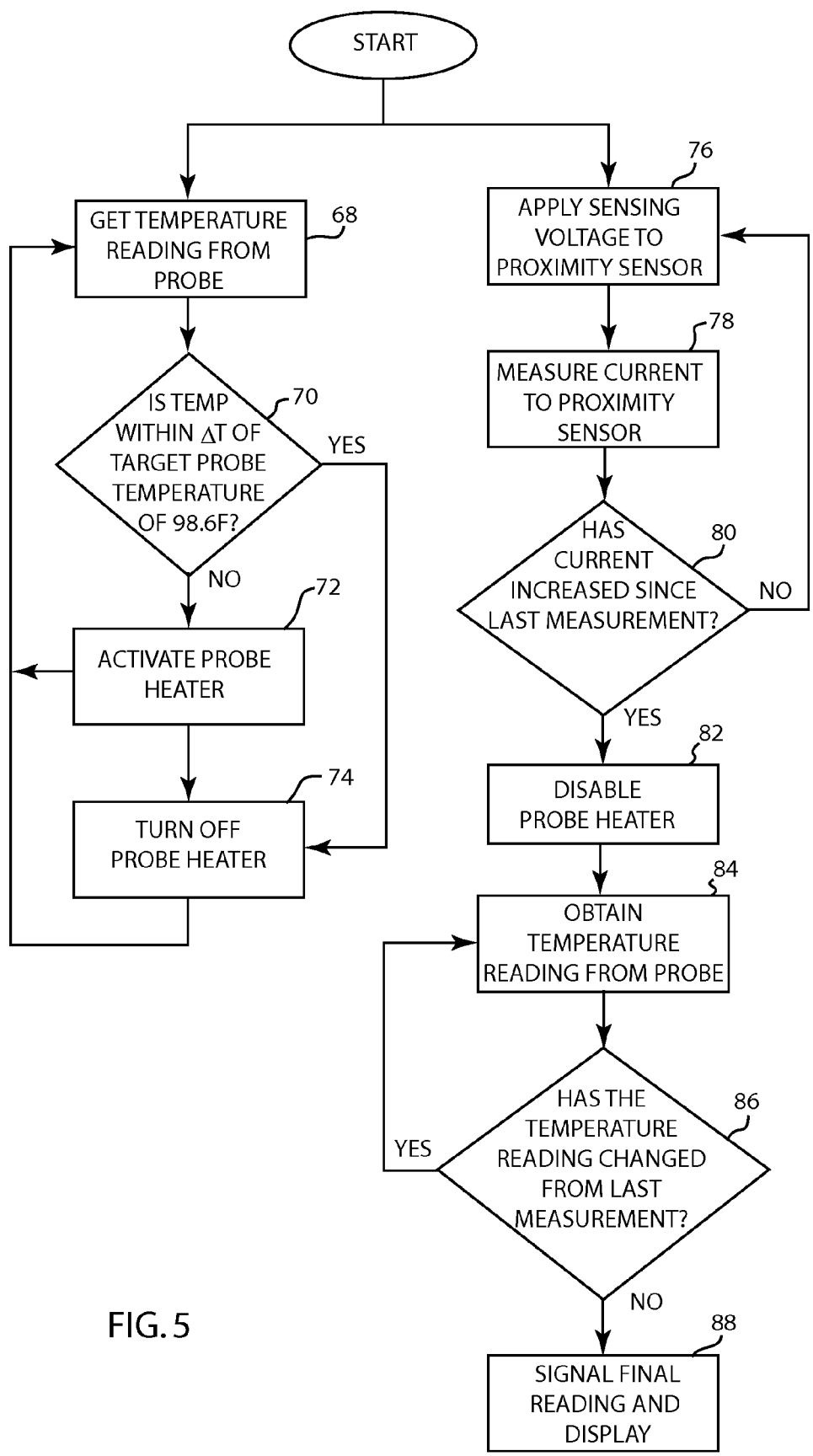
FIG. 5 is a flow diagram showing the operation of the processor within the temperature measurement system incorporating the probe tip heater, proximity sensor and temperature sensor.

Referring now to FIG. 5, thereshown is a flowchart illustrating the operation of the processor 52 that generates a temperature reading for the patient. To begin operation, the thermometer probe 12 is removed from the well 28, which closes a switch 66 shown in FIG. 4 to indicate that the steps of carrying out a temperature measurement are to begin. When the temperature probe is initially removed, the processor first performs a temperature reading, as shown in step 68. Upon receiving the initial temperature reading, the processor determines in step 70 whether the temperature of the probe is within a range of the target probe temperature which, in this embodiment, is set at a temperature of 98.6°. If the temperature is outside of the temperature range, the processor activates the heater probe in step 72 and again monitors the temperature reading from the probe. This process continues until the temperature of the probe reaches the target probe temperature. Once the target temperature of the probe is reached, the processor turns off the heater in step 74 and continues to monitor the temperature of the probe, as received from the temperature sensor.

At the same time the temperature within the probe is being maintained at the target temperature, the processor activates the AC drive circuit 64, which applies an AC voltage to the proximity sensor, as illustrated in step 76. The processor 52 monitors the amount of current to the proximity sensor in step 78 and determines whether the current has increased since the last measurement, as shown in step 80. If the current has not increased, the AC voltage remains at the proximity sensor signal level and is again sent to the proximity sensor and the current drawn by the proximity sensor is continuously monitored.

If the processor determines in step 80 that the current has significantly increased, this indicates that the probe has been placed into close proximity with the patient and the steps of estimating the patient's temperature can begin. The first step in estimating the patient's temperature is to disable the probe heater in step 82 to make sure that the probe heater does not affect the temperature estimate being generated by the electronic thermometer. Once the probe heater has been disabled, the processor obtains the temperature reading from the probe in step 84 and determines whether the temperature reading has changed from the last measurement, as indicated in step 86. Various different methods of estimating the temperature of the patient are well known, such as shown in U.S. Pat. Nos. 5,632,555 and 6,698,921. Each of these methods function effectively to estimate the temperature of the patient and the disclosure of each is incorporated herein by reference.

As discussed previously, the elevation of the probe temperature to a target temperature at or near the normal temperature for a human allows the amount of time required to estimate the patient's temperature to be significantly decreased, as compared to prior systems that utilize probe temperatures well below the normal temperature for a human. Once the estimated value for the patient's temperature has been calculated, the temperature is displayed in step 88.

As described previously, the proximity sensor 60 shown and described in the above description can be of various different configuration styles while operating within the scope of the present invention. Most importantly, the proximity sensor is positioned within the thermometer probe and generates a contact signal indicating that the thermometer probe is in position to measure the patient's temperature. The proximity sensor is separate from the temperature sensor contained within the thermometer probe such that the signal from the temperature sensor is not used to trigger the temperature measurement within the electronic thermometer. The use of a separate proximity sensor allows the temperature of the probe tip to be elevated relative to prior systems that utilize the temperature sensor to indicate when the probe was in position for detecting a patient's temperature.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

I claim:

1. An electric thermometer for estimating the temperature of a patient, the thermometer comprising:
   a probe having a probe tip for positioning in contact with the patient;
   a temperature sensor mounted within the probe for producing a temperature signal indicative of the temperature of the probe;
   a heater positioned within the probe and operable to heat the probe;
   a proximity sensor positioned within the probe and operable to produce a contact signal when the probe tip is in close proximity with the patient; and
   a processor configured to receive the temperature signal from the temperature sensor and operate the heater to maintain the probe at a target temperature, wherein the processor receives the contact signal from the proximity sensor and disables the operation of the heater upon receipt of the contact signal.

2. The electronic thermometer of claim 1 wherein the proximity sensor is a capacitive proximity sensor positioned in contact with the probe tip, wherein the probe tip is formed from a metallic material.

3. The electronic thermometer of claim 2 wherein the capacitive proximity sensor receives an AC voltage and the contact signal is the level of current supplied to the capacitive proximity sensor, wherein the processor disables the operation of the heater upon an increase in the level of current supplied to the capacitive proximity sensor.

4. The electronic thermometer of claim 1 wherein the processor estimates the temperature of the patient after the heater has been disabled.

5. The electronic thermometer of claim 1 wherein the target temperature is approximately 98.6° F.

6. The electronic thermometer of claim 5 wherein the processor displays the temperature of the patient after the heater has been disabled for at least a measurement period and the temperature signal is constant.

7. A method of estimating a patient's temperature using an electronic thermometer having a probe, the method comprising the steps of:
   positioning a proximity sensor within the probe, the proximity sensor being operable to generate a contact signal when the probe is in close proximity to the patient;
   monitoring the temperature of the probe;
   selectively activating a heater within the probe to maintain the probe at a target temperature;
   disabling the operation of the heater upon detection of the contact signal from the proximity sensor when the probe is in close proximity to the patient; and
   estimating the temperature of the patient based upon the monitored temperature of the probe.

8. The method of claim 7 wherein the temperature of the patient is estimated after the heater has been disabled upon detection of the probe within close proximity to the patient.

9. The method of claim 7 wherein the contact sensor is a capacitive proximity sensor positioned in contact with the probe tip, wherein the capacitive proximity sensor produces a contact signal when the probe tip is in close proximity to the patient.

10. The method of claim 9 further comprising the step of positioning a probe cover over the probe, wherein the proximity sensor produces the contact signal when the probe cover is in contact with the patient.

11. The method of claim 7 wherein the heater is selectively activated to maintain the temperature of the probe at the target temperature of approximately 98.6° F.

12. The method of claim 7 further comprising the steps of:
    monitoring the temperature of the probe after the heater has been disabled; and
    displaying the estimated patient temperature once the monitored temperature of the probe has become generally constant for at least a measurement period.

13. The method of claim 7 further comprising the steps of:
    applying a high frequency AC voltage to the probe tip, wherein the probe tip is formed from a metallic material;
    monitoring the amount of current being applied to the probe tip; and
    generating the contact signal upon an increase in the current supplied to the probe tip.

14. The method of claim 7 wherein the step of estimating the temperature of the patient includes monitoring the change in the probe temperature from the target temperature after the heater has been disabled.

15. A temperature sensing probe for use with an electronic thermometer operable to estimate a patient's temperature, comprising:
    a generally hollow probe body;
    a metallic probe tip formed at a distal end of the probe body;
    a temperature sensor positioned in contact with the probe tip and operable to generate a temperature signal indicative of the temperature of the probe tip;
    a heater positioned in contact with the probe tip and selectively operable to heat the probe tip; and
    a proximity sensor positioned within the probe and operable to product a contact signal when the probe tip is placed in close proximity with the patient.

16. The temperature sensing probe of claim 15 wherein the proximity sensor is a capacitive proximity sensor positioned in contact with the metallic probe tip.

17. The temperature sensing probe of claim 15 wherein the proximity sensor receives a high frequency AC voltage such that the amount of current supplied to the proximity sensor increases when the probe tip is placed in close proximity to the patient.

18. The temperature sensing probe of claim 16 further comprising a probe cover positionable over the probe tip, wherein the contact sensor is configured to produce the contact signal upon contact between the probe cover and the patient.

* * * * *